US008253392B2

(12) United States Patent
Thiesen et al.

(10) Patent No.: US 8,253,392 B2
(45) Date of Patent: Aug. 28, 2012

(54) METHOD FOR DISCHARGING CAPACITIVE LOADS

(75) Inventors: Jack Thiesen, Plymouth, MI (US); Dan J. Clingman, Auburn, WA (US)

(73) Assignees: Compagnie General Desesta Blissements Michelin (FR); Michelin Recerche et Technique S.A. (CH); The Boeing Company, Chicago, IL (US)

( * ) Notice: Subject to any disclaimer, the term of this patent is extended or adjusted under 35 U.S.C. 154(b) by 409 days.

(21) Appl. No.: 12/526,717

(22) PCT Filed: Feb. 22, 2008

(86) PCT No.: PCT/US2008/054766

§ 371 (c)(1), (2), (4) Date: Aug. 11, 2009

(87) PCT Pub. No.: WO2008/103932

PCT Pub. Date: Aug. 28, 2008

(65) Prior Publication Data

US 2010/0102782 A1 Apr. 29, 2010

Related U.S. Application Data

(60) Provisional application No. 60/903,209, filed on Feb. 23, 2007.

(51) Int. Cl.
*H02J 7/00* (2006.01)
*H03K 3/00* (2006.01)

(52) U.S. Cl. ........................................ 320/166; 307/107

(58) Field of Classification Search .................. 320/166
See application file for complete search history.

(56) References Cited

U.S. PATENT DOCUMENTS 4,227,402 A * 10/1980 Dooley et al. .............. 73/114.18
6,292,317 B1 * 9/2001 Alexander ...................... 360/31
6,522,048 B1 * 2/2003 Burns et al. .............. 310/316.01
6,894,460 B2 * 5/2005 Clingman ..................... 320/166
6,995,496 B1 2/2006 Hagood, IV et al.

OTHER PUBLICATIONS

International Search Report and Written Opinion for PCT/US2008/054766, dated Jul. 15, 2008.

* cited by examiner

*Primary Examiner* — M'Baye Diao

(57) ABSTRACT

Methods for storing electrical energy discharged from a capacitive source, embodiments including developing a capacitive load in the source and closing a switch between the capacitive source and a voltage conversion block after an output voltage of the source both exceeds a threshold value and is detected to peak. The conversion block includes an inductor and the storage device connected in series and further may include a diode connected in parallel across the inductor and the storage device. Apparatus for storing electrical energy discharged from a capacitive source include embodiments having a capacitive source configured to produce an output voltage, a switch connected to the source, an inductor connected to the switch, a storage device connected to the inductor and a controller configured to close the switch after an output voltage of the source both exceeds a threshold value and is detected to peak.

22 Claims, 4 Drawing Sheets

METHOD FOR DISCHARGING CAPACITIVE LOADS

This application claims the benefit of U.S. Provisional Application No. 60/903,209, filed Feb. 23, 2007.

BACKGROUND OF THE INVENTION

1. Field of the Invention

This invention relates generally to electrical energy storage and more specifically, to storing the energy discharged from a capacitive load.

2. Description of the Related Art

Harvesting energy from intermittent mechanical disturbances can be of great value for powering remote sensors as well as a wide array of other types of devices. Even if the disturbances are relatively insignificant at any given frequency and do not produce a substantial amount of energy, the total energy collected over a wide frequency spectrum might still be enough to supply power if a suitable means of transduction is available. Piezoelectric transducers are made of materials which possess the property of being able to transform mechanical forces into an output electrical energy. In a piezoelectric device, positive and negative electrical charges are separated when the material from which the device is made undergoes strain and a voltage is generated across the material.

In general, the amplitude of the generated electrical signal is a function of the size of the piezoelectric device and the level of strain or stress applied to it. The frequency of the generated electrical signal is a function of the frequency of the stress and strain to which the piezoelectric device is subjected. When an oscillatory strain such as a vibration is applied to a piezoelectric material, the amplitude and frequency of the generated signal may vary considerably depending on the material itself and the ability of the device to couple mechanical vibrations into stain within the piezoelectric device.

While various apparatus and methodologies have been developed for accumulating generated energy, no design has emerged that generally encompasses all of the desired characteristics as hereafter presented in accordance with the subject technology.

SUMMARY OF THE INVENTION

Particular embodiments of the present invention include methods for storing electrical energy discharged from a capacitive source. Such methods include developing a capacitive load in the source and closing a switch between the capacitive source and a voltage conversion block after an output voltage of the source both exceeds a threshold value and is detected to peak. The conversion block includes an inductor and the storage device connected in series and further may include a diode connected in parallel across the inductor and the storage device.

Such methods may further include opening the switch after a predetermined period of time and transferring the electrical energy within the voltage conversion block from an inductor to a storage device.

Particular embodiments of such methods include, in addition to developing a capacitive load in the source, closing a switch between the capacitive source and a voltage conversion block after an output voltage of the source is determined to exceed a threshold value and opening the switch as the current through an inductor of the voltage conversion block is determined to reach a target value.

Such methods may further include transferring the electrical energy within the voltage conversion block from the inductor to a storage device.

Particular embodiments of the present invention include apparatus for storing electrical energy discharged from a capacitive source. Such apparatus include a capacitive source configured to produce an output voltage, a switch connected to the source, an inductor connected to the switch, a storage device connected to the inductor and a controller configured to close the switch after an output voltage of the source both exceeds a threshold value and is detected to peak.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
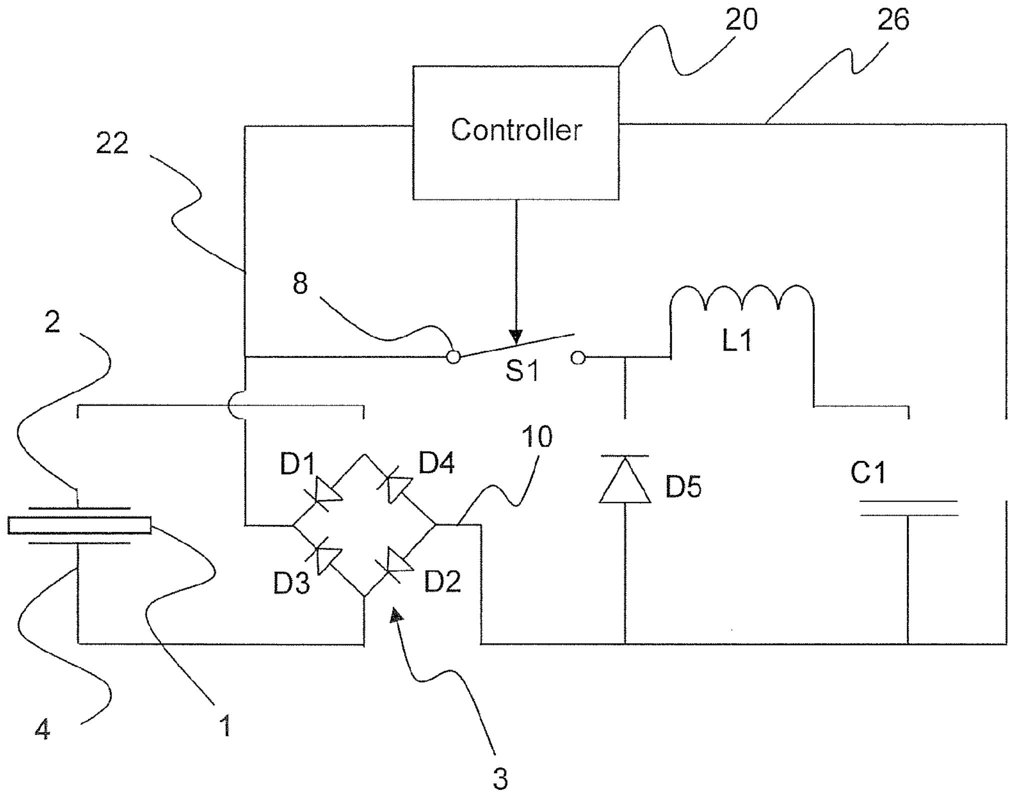
FIG. 1 illustrates an exemplary embodiment of a transducer circuit providing energy collection.

Harvested energy from an electrical energy source can be used to power a wide array of apparatus. If such harvested energy is not used immediately to power an apparatus, the electrical energy may be stored in a storage device such as, for example, a capacitor or a rechargeable battery. One or more apparatus may then draw upon the stored energy from the storage device as and when needed.

The present invention includes methods and apparatus for storing electrical energy discharged from an electrical energy source of a capacitive nature to an energy storage device. The source of the electrical energy may include any source of a capacitive nature. Such capacitive sources may include, for example, a piezoelectric transducer or a capacitor. While much of the discussion that follows focuses on the example of a piezoelectric device as the capacitive source, it is recognized that the invention is not so limited.

The methods and apparatus disclosed herein are particularly useful with, though not limited to, a capacitive source that provides a low amount of electrical energy, e.g., from a piezoelectric transducer mounted inside of a tire. The amount of energy collected due to piezoelectric transduction is dependent upon the ability to transfer the voltage difference across the piezoelectric material into a storage medium. If the voltage is allowed to rise and fall with vibrations, however, energy may not be collected. The methods and apparatus disclosed herein are further particularly useful with, though not limited to, a capacitive source that produces random or scattered voltage peaks, i.e., some peaks very high and other peaks quite low relative to one another and with other peaks scattered randomly throughout.

Particular embodiments of the present invention include methods and apparatus that transfer the electrical energy at or near its peak voltage so that a greater amount of electrical energy is recovered and stored in the storage device. Arrangements to store the greater amount of electrical energy from the capacitive source include the source connected through a switch to a voltage conversion block. The voltage conversion block includes an inductor and the storage device. The switch is then opened and closed at optimum times so that the electrical energy can transfer from the capacitive source through the switch to the inductor and then to the storage device.

In particular embodiments utilizing such arrangements there are methods for storing electrical energy discharged from the capacitive source that include developing a capacitive load in the source. As the capacitive source builds and reaches a maximum or peak voltage, the method includes closing the switch between the capacitive source and the voltage conversion block after the output voltage of the source exceeds a threshold value AND as the output voltage of the source is detected to peak. Closing the switch when the output voltage both exceeds the threshold value and reaches a peak is particularly useful with, but not limited to, embodiments of methods that are performed with a capacitive load having output voltage peaks that vary in value randomly, with high and low peaks relative one to the other.

After the switch closes, the voltage stored in the capacitive source is applied entirely across the inductor of the voltage conversion block. Because power is the time rate of change of energy, an instantaneous change in energy would require an infinite power. This instantaneous change in energy is contrary to standard notions of physical systems as the energy stored in any element of a system must be a continuous function of time. Because energy stored in an inductance is proportional to the square of the current, immediately after the switch is closed, the voltage is dropped across the inductor and no current immediately flows. As current does begin to flow through the inductor across the switch, the voltage drops in the source and the voltage increases in the storage device.

Particular embodiments further include opening the switch at a predetermined time. At the point of opening the switch, particular embodiments provide that approximately half of the energy from the capacitive source is stored in the storage device and half is stored in the inductor. After the switch is opened, the electrical energy that is stored in the inductor at that time transfers to the storage device as the capacitive source again starts to build to a peak value. Particular embodiments of methods therefore include transferring the electrical energy within the voltage conversion block from the inductor to the storage device.

The switch between the capacitive source and the voltage conversion block is closed and opened by a controller. Any controller, including both analogue controllers and digital controllers, known to one having ordinary skill in the art that is capable of performing the functions described herein would be suitable for use in embodiments of the present invention. In particular embodiments, the controller may, for example, detect the peak voltage value of the capacitive source and/or determine that the output voltage of the capacitive source exceeds a threshold value and/or determines a time that a voltage peak of the source may be expected to occur and further would be capable of opening and closing the one or more switches at the proper times as included in particular embodiments. Examples of suitable controllers are provided below and more particularly, in the figures.

Particular embodiments may further include comparing the output voltage of the source with a threshold value and determining that the output voltage exceeds the threshold value since one of the determinants for closing the switch is that the output voltage of the source exceeds the threshold valued.

Since the other determent for closing the switch in particular embodiments is that the output voltage of the source is detected to peak, particular embodiments may further include closing a second switch as the output voltage of the source exceeds that threshold value and sending a signal through the closed second switch as the output voltage of the source is detected to peak. The embodiments may further include receiving the signal by the first switch as an instruction to close. In this manner, the switch between the capacitive load and the inductor of the voltage conversion block receives a signal to close after the controller has determined both that the output voltage of the source exceeds the threshold value AND the output voltage of the source has been detected to peak. In particular embodiments, after the second switch is opened before the predetermined period of time that opens the switch between the source and the inductor.

Particular embodiments for storing electrical energy discharged from a capacitive source, in addition to developing a capacitive load in the source, may further include closing the switch between the capacitive load and the voltage conversion block after the output voltage of the source is determined to exceed a threshold value. These embodiments are particularly useful with, but not limited to, embodiments of methods that are performed with a capacitive load having output voltage peaks that are quite similar in value.

After the switch is closed, current will continue to increase until the current flow through the inductor peaks. The current may be measured to determine when the current peaks so that the switch can be opened. Alternatively, the time that the current is expected to peak may be calculated so that the switch can be opened at that time. Therefore, particular embodiments may further include a controller that is capable of opening the switch by comparing a value of the inductor current with a second reference value and determining that the current through the inductor has reached a target value as the value of the inductor current exceeds the second reference value. Particular embodiments may determine that the switch should opened by calculating a time when a value of the inductor current is expected to reach the target value and determining that the current through the inductor has reached the target value at the calculated time.

Particular embodiments of methods of the present invention may further include rectifying the electrical energy from the capacitive source. It is noted that the electrical energy may be full-wave rectified or only partially rectified.

Particular embodiments of the present invention further include apparatus for storing electrical energy discharged from a capacitive source. Particular embodiments of such apparatus include a source connection configured to connect to the capacitive source. Any connection known to one having ordinary skill in the art that is suitable for connecting to the capacitive source is acceptable for use with the present invention. Such source connections may include, for example, wires, cables, plugs, sockets, terminals, ports, printed circuits or combinations thereof. Particular embodiments may further include the capacitive source configured to produce an output voltage in a connected configuration with the source connection.

Particular embodiments of apparatus further include a switch connected to the capacitive source, an inductor connected to the switch, a storage device connected to the inductor and a controller configured to close the switch as an output voltage of the source both exceeds a threshold value and is detected to peak. Particular embodiments may further include a diode connected in parallel across the inductor and the storage device. The switch separates the transduction block from the voltage conversion block.

As explained below, particular embodiments of the apparatus have an inductor that has a value greater than $$\frac{C_1}{\left(\frac{2i_s}{V_1\pi}\right)^2}$$

wherein $C_1$ is the capacitive value of the storage device, $i_s$ is the saturation current of the inductor, and $V_1$ is the maximum voltage output value of the electrical energy source.

FIG. 1 illustrates an exemplary embodiment of a transducer circuit providing energy collection. A piezoelectric transducer 1 produces an output voltage between two output terminals 2, 4. A full-wave rectifier network 3 consists of, as is well known by one having ordinary skill in the art, four diodes D1, D2, D3, and D4 arranged in the rectifier network 3. The piezoelectric transducer 1 may be formed from many different materials, may have many different shapes, and may be stressed in many different ways including, but not limited to, being shocked, twisted, stretched and squeezed or combinations thereof to produce an electrical signal, i.e., an output voltage across the two output terminals 2, 4.

The rectifier network 3 includes two input terminals electrically connected to the output terminals 2, 4 of the piezoelectric transducer 1. The rectifier network 3 further includes two output terminals 8, 10. The anode of diode D1 and the cathode of diode D4 are connected to the first terminal 2 of the piezoelectric transducer 1 while the cathodes of diodes D1 and D3 are connected to the first output terminal 8 of the rectifier network 3. The anodes of diodes D2 and D4 are connected to the second output terminal 10 of the rectifier network 3 and the cathode of diode D2 and the anode of diode D3 are connected to second output terminal 4 of the piezoelectric transducer 1.

Thus connected, a positive going signal produced by the piezoelectric transducer 1 causes a current to flow from terminal 2 via diode D1 into terminal 8 and via a load connected between the two output terminals 8, 10 of the rectifier network 3 and then via diode D2 into the second output terminal 4 of the piezoelectric transducer 1. A negative going signal produced by the piezoelectric transducer 1 causes a current to flow from the second output terminal 4 of the piezoelectric transducer 1 via diode D3 into the first output terminal 8 of the rectifier network and then from the first output terminal 8 of the rectifier network into the second output terminal 10 of the rectifier network 3 by way of an electrical load connected between the two terminals and then via diode D4 into the first terminal 2 of the piezoelectric transducer 1. Thus the signal which is produced at the first output terminal 8 of the rectifier network 3 will always be at positive voltage with respect to the voltage at the second output terminal 10 of the rectifier network 3.

The circuit of FIG. 1 further includes a switch S1 that controls the flow of energy from the piezoelectric transducer 1 through the energy storage circuit by way of the controller 20. It should be appreciated by those of ordinary skill in the art that the switch S1 may take many forms including, but not limited to, relay type switching devices and solid state devices. The switch S1 is electrically connected between the first output terminal 8 of the rectifier network 3 and one end of an inductor L1. The other end of inductor L1 is connected to one end of a storage capacitor C1. The other end of storage capacitor C1 is connected to the second output terminal 10 of the rectifier network 3. Particular embodiments further include a diode D5 connected by its anode to the second output terminal 10 of the rectifier network 3 and by its cathode to a junction point between the switch S1 and inductor L1.

In accordance with particular embodiments of methods and apparatus, the switch S1 is closed, i.e., made electrically conductive, by operation of the controller 20 upon sensing by the controller 20 via a line 22 of a voltage that is recognized by the controller 20 as corresponding generally to a condition that the output voltage across the piezoelectric transducer 1 both (1) exceeds a threshold value AND (2) is detected to peak as will be described in more detail below. Closing the switch S1 by the signal sent from the controller 20 permits discharge of the capacitive load of the piezoelectric transducer 1, through the switch S1 and the inductor L1 to the storage capacitor C1. In addition, the controller 20 is configured to open the switch S1 after a predetermined period of time. Alternatively, the controller 20 may close the switch S1 after the output voltage of the piezoelectric transducer 1 is determined to exceed a threshold value and may close the open the switch S1 by sensing current through the inductor L1 via a current sensor (not shown) connected to the outlet of the inductor L1 through a sensing line between the controller 20 and the current sensor.

During the time that the switch S1 is closed, the diode D5 will be reverse-biased and substantially no current is allowed to flow through the diode D5 to the second output terminal 10 of the rectifier network 3. When the switch S1 opens by operation of the controller 20 (as described with the examples shown in FIGS. 4 and 5 with more detail below), current flow continues from the inductor L1 into the storage capacitor C1 with a return path through the diode D5 to transfer electrical energy within the inductor L1 to the storage device C1.

Energy stored in the storage device, i.e., the capacitor C1, is proportional to the capacitance multiplied by the square of the voltage. In the case where the voltage across the storage element C1 is doubled, the stored energy will increase by a factor of 4. Likewise, the piezoelectric transducer 1, considered as a capacitor, has the maximum available energy at the peak voltage. Therefore, energy may be transferred from the piezoelectric transducer 1 to the capacitor C1 by way of the switch S1 and the inductor L1 by configuring the controller 20 to close the switch S1 as the output voltage of the piezoelectric transducer 1 is near or at the maximum voltage across the transducer 1.

For example, the controller 20 may close the switch S1 at 90 percent of the maximum voltage across the piezoelectric transducer 1 during the period. As the switch S1 closes, the voltage stored in the piezoelectric transducer 1 is applied entirely across inductor L1.

As noted previously, because power is the time rate of change of energy, an instantaneous change in energy would require an infinite power. Such an instantaneous change in energy is, of course, contrary to standard notions of physical systems as the energy stored in any element of a system must be a continuous function of time. Because energy stored in an inductance is proportional to the square of the current, immediately after the switch S1 is closed the voltage is dropped across inductor L1 and no current flows. Slowly, current begins to flow through inductor L1 and as it does, the voltage drops in the piezoelectric transducer 1 and voltage increases in the storage device capacitor C1. Current in the circuit will continue to increase until it reaches a maximum.

It can be shown that as the current reaches a maximum, approximately half of the original energy is stored in the storage element C1 and one half is in the inductor L1. At this point, it is generally desirable to open the switch S1 and allow the inductor L1 to produce a current flow across the terminal of the storage device C1 via the diode D5.

It should be noted that the diode D5 is chosen to minimize the junction capacitance since the inductor L1, the capacitor C1 and the junction capacitance of the diode D5 form a tank circuit after the switch S1 is opened. Given the parasitic resistance of the circuit, a certain fraction of the oscillatory energy transferred from the diode D5 and the capacitor C1 will be lost as heat. Therefore, the tank circuit described must be critically damped by design.

Particular embodiments include apparatus and methods that are useful in a tire to power electronic devices contained in or about the tire. Such an embodiment, for example, may include a piezoelectric transducer as the capacitive source that develops a capacitive load through the deflection of the piezoelectric transducer by the tire rotation. The generation of electrical energy from a piezoelectric transducer in a tire is well known in the art. The methods and apparatus disclosed herein are useful for maximizing the collection of the energy from such a piezoelectric transducer. The energy generated by the discharged capacitive load can be stored, for example, in a battery or capacitor as disclosed herein. This stored energy may then be used, for example, by a tire pressure sensor and/or a transmitter for transmitting information regarding the tire condition.

Figure 2:
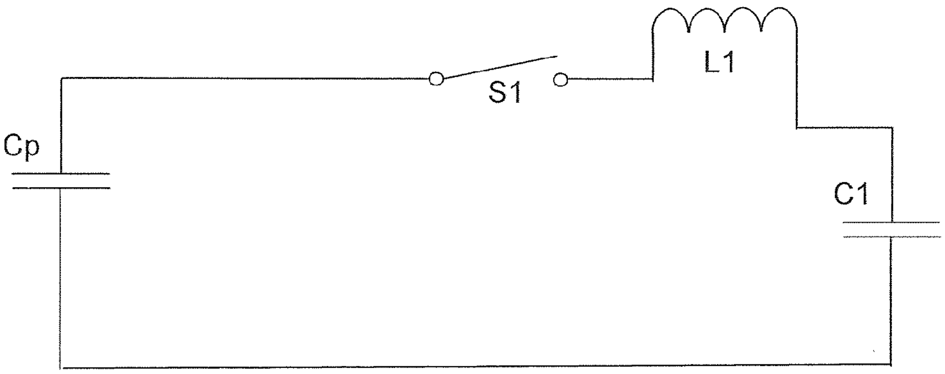
FIG. 2 illustrates a simplified representation of the circuit of FIG. 1.

FIG. 2 illustrates a simplified representation of the circuit of FIG. 1. For purposes of the following analysis, the circuit illustrated in FIG. 1 may be substantially simplified. If the discharge time is relatively short compared to the period of the vibrations induced in piezoelectric transducer 1, neither the rectifier network 3, the vibrational field nor the diode D5 need be considered between the time that the switch S1 is closed and the time it is opened since it may be assumed that all of these elements are in quasi-static states. In the circuit illustrated in FIG. 2, the piezoelectric transducer 1 and the rectifier network 3 have been lumped as a single ideal capacitance Cp. The diode D5 has been eliminated since it will be reverse-biased from the time the switch S1 is closed until it is opened.

The following analysis is provided but such analysis is not meant to limit the invention in any way. Considering the circuit of FIG. 2, assuming that there is an initial voltage Vp on the capacitor Cp at time t=0, when the switch is closed it is relatively straightforward to solve for the charge and voltage as a function of time. Kirchoff's voltage law states:

$$V_{Cp}-V_{L1}-V_{C1}=0 \tag{1}$$

wherein $V_{Cp}$ is the voltage across capacitor Cp, $V_{L1}$ is the voltage across the inductor L1 and $V_{C1}$ is the voltage across the storage device, C1.

It is known that:

$$V_{Cp}=\frac{Q_0-Q(t)}{C_p} \tag{2}$$

$$V_{L1}=L_1\frac{di}{dt}=L_1\frac{d^2Q(t)}{dt^2} \tag{3}$$

$$V_{C1}=\frac{Q(t)}{C_1} \tag{4}$$

wherein Q(t) is defined as the charge as a function of time and implicitly assumes that charge is conserved in the circuit and $Q_0$ is defined as the initial charge on $C_p$. Substituting Equations (2) through (4) into Equation (1) provides the following second order differential equation:

$$\frac{Q_0-Q(t)}{C_p}-L_1\frac{d^2Q(t)}{dt^2}-\frac{Q(t)}{C_1}= \tag{5}$$

$$\frac{Q_0}{C_p}-L_1\frac{d^2Q(t)}{dt^2}-Q(t)\left(\frac{1}{C_1}+\frac{1}{C_p}\right)=a-bQ(t)-L1\frac{d^2Q(t)}{dt^2}=0$$

For $a=\frac{Q_0}{C_p}$ and $b=\frac{1}{C_1}+\frac{1}{C_p}$

The solution for Equation (5) is trivially:

$$Q(t)=\frac{a}{b}\left(1-\mathrm{Cos}\left(t\sqrt{\frac{b}{L_1}}\right)\right) \tag{6}$$

Therefore, the current is:

$$i(t)=\frac{dQ(t)}{dt}=\frac{a}{\sqrt{bL_1}}\mathrm{Sin}\left(t\sqrt{\frac{b}{L_1}}\right) \tag{7}$$

A ratio α may be defined as the ratio of the ideal capacitance Cp to the capacitance of the storage device capacitor C1. Thus C1=αCp, and Equations (6) and (7) can be rewritten using this ratio as follows:

$$Q(t)=\frac{Q_0\alpha C_p}{1+\alpha}\left(1-\mathrm{Cos}\left(t\sqrt{\frac{1+\alpha}{\alpha C_pL_1}}\right)\right) \tag{8}$$

$$i(t)=Q_0\sqrt{\frac{\alpha}{(1+\alpha)C_pL_1}}\,\mathrm{Sin}\left(t\sqrt{\frac{1+\alpha}{\alpha C_pL_1}}\right) \tag{9}$$

Equations (8) and (9) are therefore the complete solutions of charge and current in the simplified discharge circuit as a function of time after the switch is closed.

The energy in an inductor is equal to one half of the inductance multiplied by the square of the current. As pointed out above, the intent of the circuit is to transfer energy in from the transducer to the inductor. Therefore, one would open switch S1 at the condition of maximum current flowing through the inductor. This would be true when the argument of the Sin function in Equation. (9) is equal to π/2, and therefore the duration of the switch closure can be determined as:

$$t=\frac{\pi}{2}\sqrt{\frac{\alpha L_1C_p}{1+\alpha}} \tag{10}$$

Given a stopping time for the discharge process as shown in Equation (10), an estimate of the energy in each component of the simplified circuit starting with the piezoelectric capacitor, Cp. For Cp:

$$E_{Cp}=\frac{C_pV_p^2}{2}=\frac{C_p}{2}\left(\frac{Q_0-Q(t)}{C_p}\right)^2 \tag{11}$$

-continued $$= \frac{C_p}{2}\left(\frac{Q_0 - \frac{a}{b}}{C_p}\right)^2$$

$$= \frac{Q_0^2}{2C_p}\left(1 - \frac{\alpha}{1+\alpha}\right)^2$$

Equation (11) evaluates the function Q(t) at the time given by Equation (10) and using Equations (6) and (8). The calculation is simplified since the argument of the cos function reduces to 0. The result in Equation (11) gives a simple expression for the amount of energy remaining in the device, Cp, after the discharge period. In an analogous manner, the energy in the inductor and storage element may be described as follows:

$$E_{L1} = \frac{L_1 i^2}{2} = \frac{L_1}{2}\left(\frac{a}{\sqrt{bL_1}}\right)^2 = \frac{a^2}{2b} = \frac{Q_0^2}{2C_p}\left(\frac{\alpha}{1+\alpha}\right) \tag{12}$$

$$E_{C1} = \frac{C_1 V_1^2}{2} = \frac{\alpha C_p}{2}\left(\frac{Q(t)}{\alpha C_p}\right)^2 = \frac{1}{2\alpha C_p}\left(\frac{a}{b}\right)^2 = \frac{Q_0^2}{2C_p}\frac{\alpha}{(1+\alpha)^2} \tag{13}$$

To test the results of these calculations, one would sum the alpha coefficients of each energy term found in Equations. (11) through (13). The principle of conservation of energy states that the total energy of an isolated system remains constant regardless of changes within the system. Thus, the total energy of the simplified circuit of FIG. 2 will remain equal to $Q_0^2$ divided by the ideal capacitance Cp multiplied by 2, while the total of all the pre-factors will sum to one. The summation is as follows:

$$\left(1 - \frac{\alpha}{1+\alpha}\right)^2 + \left(\frac{\alpha}{1+\alpha}\right) + \frac{\alpha}{(1+\alpha)^2} =$$

$$\left(\frac{1}{1+\alpha}\right)^2 + \left(\frac{\alpha(1+\alpha)}{(1+\alpha)^2}\right) + \frac{\alpha}{(1+\alpha)^2} = \frac{1+2\alpha+\alpha^2}{(1+\alpha)^2} = 1$$

Thus, it is clear that energy has been conserved and the Equations 11-13 have been verified for correctness. The preceding results may be used to estimate component sizes and conversion on-times. That is, the method of the present invention may be used to calculate a time when a value of the inductor current is expected to reach a peak or target value and one may then recognize that calculated value as the peak value of the inductor current and operate switch S1 in accordance with those calculations.

It should be appreciated by those of ordinary skill in the art that since parasitic losses have not been taken into account, these results are approximate. However with proper design, parasitic losses can be controlled within manageable levels. The next step is to find the value for alpha. An estimation for alpha may be derived after noting that for values of alpha greater than ten, almost all of the energy has been removed from the piezoelectric capacitor. With an efficient transfer from the inductor, L1, into the storage element, C1, one may write Ecp≈Ec1, or:

$$\frac{C_p V_p^2}{2} = \frac{C_1 V_1^2}{2} = \frac{\alpha C_p V_1^2}{2} \tag{14}$$

This relation implies that energy conservation gives a range of possible maximum voltages and a range of target voltages and the design considers the constraints placed upon it due to the intrinsic piezoelectric capacitance and the desired capacitance of the storage device. This is set by energy delivery requirements and acceptable droop voltage of the electronics being powered from the device. Consider, for example, a device with a 80 nF intrinsic capacitance and an 80 mF capacitor as the storage device. If the piezoelectric device produces 30V output, each cycle produces 36 uJ; the 80 mF capacitor operated at 5.5V has 1.21 J of energy and thus will be charged in 33,000 cycles. For a nominal frequency of 10 Hz, that is equivalent to 55 minutes.

Having dealt with the issues associated with capacitor choice, the next step is to look at inductor choices. For a large alpha one finds from Equation (10) that:

$$t \approx \frac{\pi}{2}\sqrt{L_1 C_1} \tag{15}$$

However, this relation is constrained by the saturation current of the inductor. It is well known in the art that as the current through an inductor increases, its inductance decreases. This is due to the underlying physics of the core material. How much the inductance decreases is significant: if it decreases substantially, a converter employing such an inductor may not work properly any more. The current at which the inductor does not function properly in the circuit is the saturation current, and is a parameter of the inductor. Thus, to avoid the constraint of saturation, one must also satisfy:

$$\frac{C_1 V_1}{t} < i_s \rightarrow \frac{V_1 \pi}{2}\sqrt{\frac{C_1}{L_1}} < i_s \rightarrow L_1 > \frac{C_1}{\left(\frac{2i_s}{V_1 \pi}\right)^2} \tag{16}$$

Thus the task becomes one of searching out components which satisfy the constraints of Equation (16) for a given piezoelectric capacitance and a given maximum piezoelectric voltage. For example, consider an 80 nF piezoelectric capacitance and a 30V output. If the saturation current is 1.2 A, the inductor must be at least 123 uH to satisfy Equation (16).

Those of ordinary skill in the art will appreciate from the forgoing that specific time relationships may be established via calculations whereby switching operations and times may be established based on selected component values. It should be appreciated, however, that as specific electrical components do vary in values due to manufacturing tolerances and other considerations, other methods may also be provided to determine when switching operations should be effected to achieve the desired results.

Figure 3:
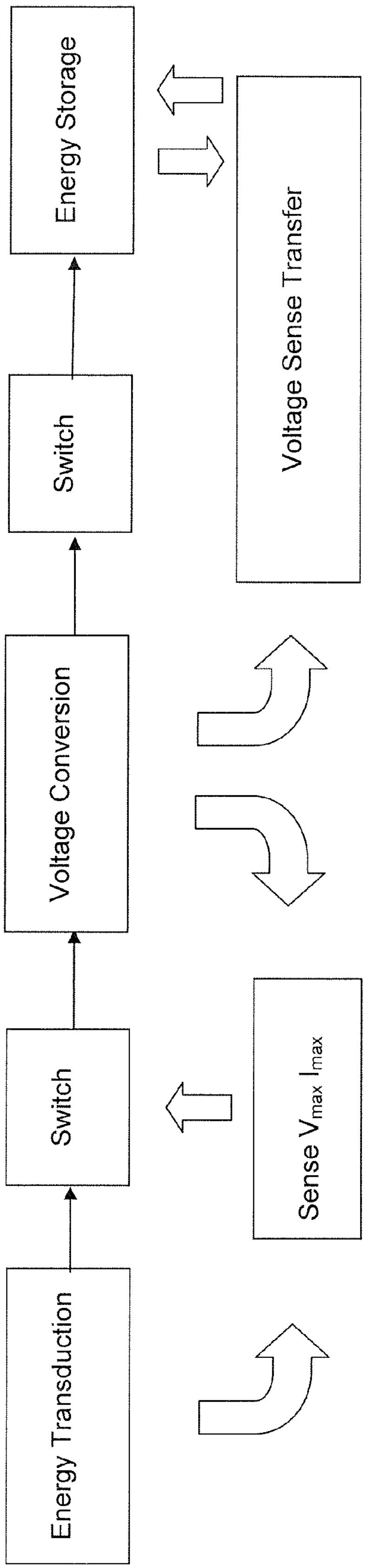
FIG. 3 diagrammatically illustrates a general circuit topology for performing energy conservation.

FIG. 3 diagrammatically illustrates a general circuit topology for performing energy conservation. The exemplary circuit topology for performing energy conversion illustrates the control of the switch between the energy transduction block and the energy conversion block. The conversion circuit is broken into five operational blocks which partition system function. The first three, the energy transduction, voltage conversion, and sense Vmax/Imax control blocks make up a voltage converter, although in this embodiment, it is a single cycle device. The illustration of the use of a buck converter indicates that small numbers of electrons at a higher potential have been produced and it is desired to convert these into a larger number of electrons at a lower potential. Thus the exemplary arrangement may be used for potential reduction with energy conservation. The energy storage and voltage transfer controls also illustrated in FIG. 3 determine how the energy is to be used and managed and are not required for conversion.

As pointed out above, a significant aspect of the operation of particular embodiments of the present invention is determining when the output voltage from the capacitive source, for example a piezoelectric device, has reached a value that triggers the switch between the transduction block and the voltage conversion block to open and/or close. Two examples of voltage sensing devices useful for this aspect are a threshold detector, which may be configured to close the switch S1 whenever the voltage on the piezoelectric device exceeds a specified or predetermined value and a peak detector which finds each peak using, for example, a zero crossing detector configuration. It will be appreciated by those of ordinary skill in the art that there are other controllers that can accomplish this task including, without limitation, circuits, solid state devices, analogue controllers, digital controllers and combinations thereof.

Figure 4:
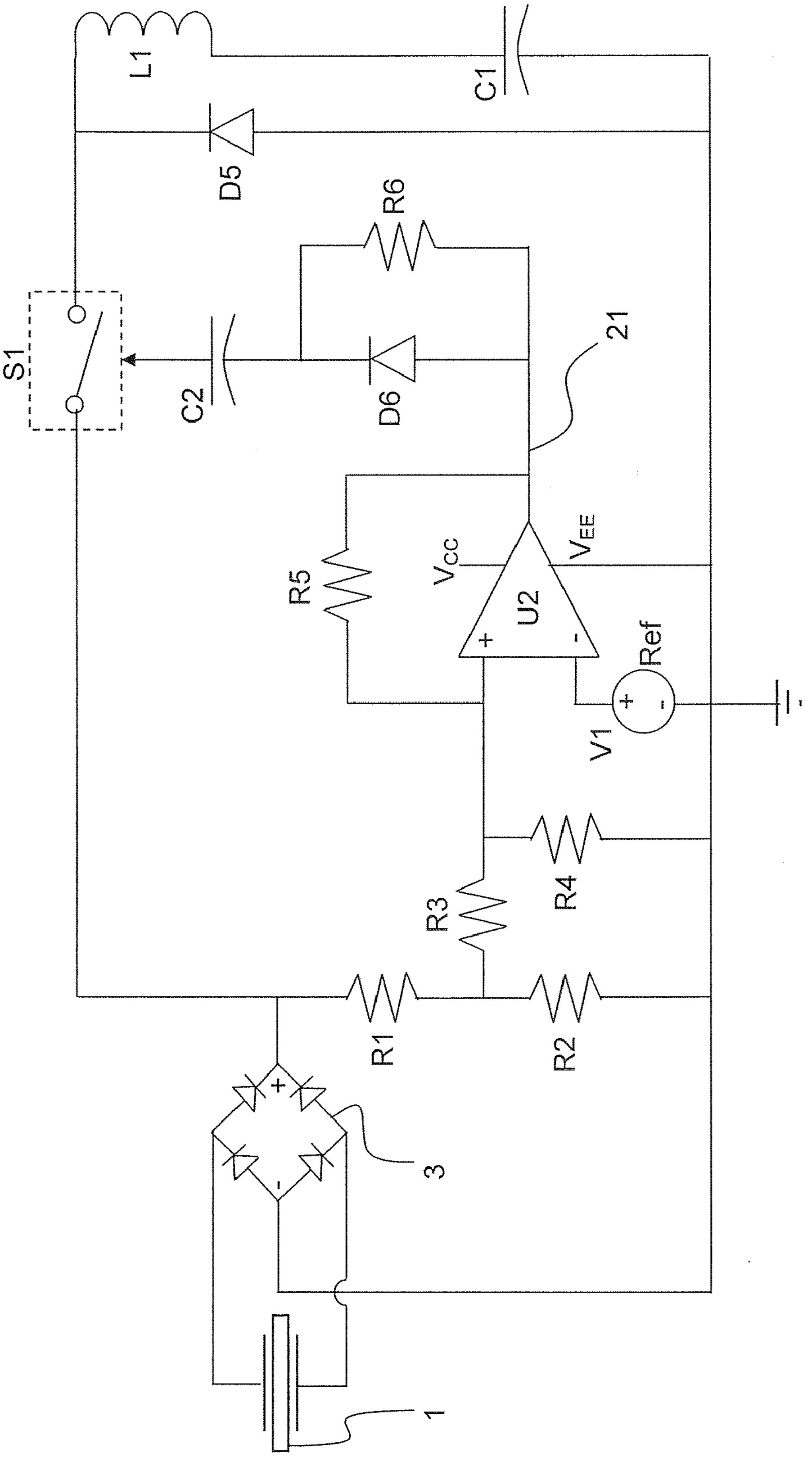
FIG. 4 illustrates an exemplary voltage threshold detector that may be employed in the performance of certain embodiments.

FIG. 4 illustrates an exemplary voltage threshold detector that may be employed in the performance of certain embodiments. In this threshold detector, resistors R1 and R2 form a voltage divider as one input to operational amplifier U2. The values for resistors R1 and R2 are chosen to minimize loss via current to ground as well as to provide an adequate input range into the operational amplifier U2. One example of a design process using this threshold detector would be to choose a leakage current through the voltage divider network formed by resistors R1 and R2 to be in the range of multiples of 10 nAmperes and to begin the capacitive discharge of the transducer block at no more than 29 volts under maximum tolerance extremes with a 1.25V reference into the inverting input of the operational amplifier U2.

The operation of the threshold comparator illustrated in FIG. 4 is as follows. When the voltage into the non-inverting (+) input of the operational amplifier U2 meets or exceeds the voltage into the inverting (−) input (the threshold value), the output of the operational amplifier U2 drives a digital control signal into the switch S1, causing the switch S1 to close. The switch S1 may be, for example, a solid state switching device.

With the switch S1 closed, the transduction block connects to the voltage conversion block allowing the capacitive load of the piezoelectric transducer 1 to discharge into the inductor L1 as described previously. Conversely, when the voltage into the non-inverting (+) input of the operational amplifier U2 falls below the threshold value, the output of operational amplifier U2 drops back to zero. The capacitor C2, the diode D6 and the resistor R6 control the shape of the input pulse from the output of operational amplifier U2 into the digital input of switch S1 in such a way that there is a designated persistence even after the output of operational amplifier U2 has dropped to zero. It is recognized that the capacitor C1 is the parasitic capacitance of the solid state switch S1 and the resistor R6 is chosen so that the RC time constant of the switch S1 and the resistor cause persistence or hysteresis in the actuation of the switch S1. In this manner, the switch S1 closed and opens only after the period of time set by shaped input pulse from the operational amplifier U2. Resistors R3, R4 and R5 are used to control the hysteresis bandwidth of the operational amplifier U2 to prevent coupled noise from affecting the output state.

Figure 5:
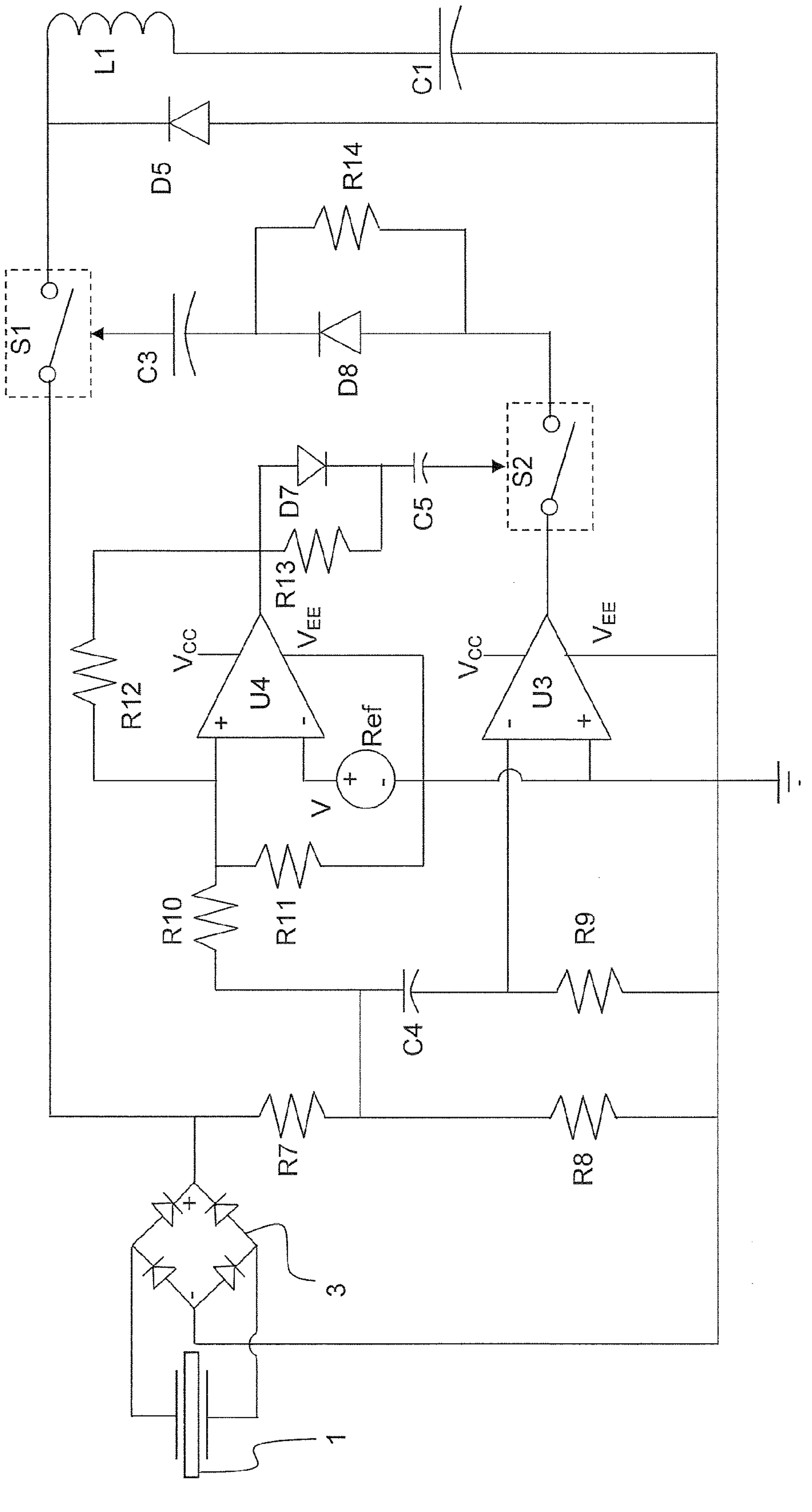
FIG. 5 illustrates both an exemplary voltage peak detector and voltage threshold detector that may be combined in the performance of certain embodiments.

FIG. 5 illustrates both an exemplary voltage peak detector and voltage threshold detector that may be combined in the performance of certain embodiments. A threshold detector includes the operational amplifier U4 and a zero crossing detector used as a peak detector includes operational amplifier U3.

The signal into the inverting (−) input of the operational amplifier U3 is from the output of a common analog differentiator formed by the resistor R9 and the capacitor C4. The input of the differentiator is chosen as the voltage formed by the divider consisting of resistors R7 and R8.

The input of the divider is also used at the non-inverting (+) input of the operational amplifier U4, which is included in the threshold detector. The operation of the threshold detector of FIG. 5 is similar to that described in FIG. 4 except that the output of the operational amplifier U4 if FIG. 5 drives the AND switch S2.

The divider conditions the voltage so as not to exceed the input rails of operational amplifier U4. The operational amplifier U4 must be realized using high-value resistors to minimize current to ground from the output of the rectifier network 3. The magnitude of the built-in reference V will constrain the divider ratio formed by the resistors R7, R8. The values of the capacitor C4 and the resistor R9 are chosen so that the RC time constant is in the range of twenty (20) times the longest period of input to rectifier network 3 from the transduction block and to provide enough frequency bandwidth to operate optimally over the frequency range required.

The peak detector, which includes operational amplifier U3, is designed to find the points where the rectified voltage is changing from increasing to decreasing, that is, the voltage extremum. By differentiating the output of the rectifier network 3 and using this to find the extremum of the functional output, a zero-crossing detector can be used to indicate the peak. The output of the zero-crossing detector is combined by means of the logical AND operator (the switch S2) with the output of the threshold detector which constrains a voltage level on the rectified signal. The logical AND is accomplished by using the output of the threshold detector as the control voltage for the switch S2. Thus the zero-crossing detector output, which forms the control voltage for switch S1, is logically true only when the rectified signal is of a sufficient voltage level AND is at an extremum. When this condition is met, the output voltage of operational amplifier U3 is used to control the digital input of the switch S1, which closes the switch S1 and connects the transduction block and the voltage conversion block.

The reason for combining the threshold detector output with the output of the zero-crossing detector by means of a logical AND is to prevent the system from latching open under indeterminate conditions such as those likely to be induced during transduction block discharge. Further, the choice of threshold condition, proper design of the hysteresis bandwidth of operational amplifier U4, and the shape of the control voltage (diode D8, capacitor C3 and resistor R14) at the switch S1 allow for design control of the discharge properties of the transduction block into the voltage conversion block.

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for storing electrical energy discharged from a capacitive source, comprising:

developing a capacitive load in the source;

comparing an output voltage of the source to a threshold value;

closing a switch between the capacitive source and a voltage conversion block after the output voltage of the source both is detected to exceed the threshold value and is detected to peak;

opening the switch after a predetermined period of time;

transferring the electrical energy within the voltage conversion block from an inductor to a storage device.

2. The method of claim 1, further comprising, rectifying the electrical energy from the source.

3. The method of claim 2, wherein the electrical energy is full-wave rectified.

4. The method of claim 1, further comprising:

closing a second switch as the output voltage of the source exceeds the threshold value;

detecting the output voltage of the source to peak;

sending a signal through the closed second switch as the output voltage of the source is detected to peak, receiving the signal by the first switch as an instruction to close.

5. The method of claim 4, further comprising: opening the second switch as the output voltage of the source decreases to a value below the threshold value.

6. The method of claim 5, wherein the second switch is opened before the first switch is opened.

7. A method for storing electrical energy discharged from a capacitive source, comprising:

developing a capacitive load in the source;

closing a switch between the capacitive source and a voltage conversion block after an output voltage of the source is determined to exceed a threshold value;

opening the switch as the current through an inductor of the voltage conversion block is determined to reach a target value, the target value associated with a current peak flowing through the inductor; and transferring the electrical energy within the voltage conversion block from the inductor to a storage device.

8. The method of claim 7, further comprising: rectifying the electrical energy from the source.

9. The method of claim 7, further comprising:

comparing a value of the inductor current with a second reference value; and determining that the current through the inductor has reached the target value as the value of the inductor current exceeds the second reference value.

10. The method of claim 7, further comprising:

calculating a time when a value of the inductor current is expected to reach the target value; and determining that the current through the inductor has reached the target value at the calculated time.

11. An apparatus for storing electrical energy discharged from a capacitive source, comprising:

a capacitive source configured to produce an output voltage;

a switch connected to the source;

an inductor connected to the switch;

a storage device connected to the inductor; and a controller configured to close the switch after an output voltage of the source both is detected to exceed a threshold value and is detected to peak.

12. The apparatus of claim 11, further comprising: a rectifier connected between the energy source and the switch.

13. The apparatus of claim 12, wherein the rectifier is a full-wave rectifier.

14. The apparatus of claim 11, Wherein the capacitive source is a piezoelectric transducer.

15. The apparatus of claim 11, wherein the capacitive source is a capacitor.

16. The apparatus of claim 11, wherein the storage device is a capacitor.

17. The apparatus of claim 11, wherein the storage device is a rechargeable battery.

18. The apparatus of claim 11, wherein the controller comprises: a voltage threshold detector configured to detect the threshold value of the output voltage of the source; and a voltage peak detector configured to detect a peak of the output voltage of the source.

19. The apparatus of claim 11, wherein the inductor has a value greater than $$\frac{C_1}{\left(\frac{2i_s}{V_1\pi}\right)^2}$$

wherein $C_1$ is the capacitive value of the storage device, $i_s$ is the saturation current of the inductor, and $V_1$ is the maximum voltage output value of the electrical energy source.

20. The apparatus of claim 11, further comprising: a diode connected in parallel across the inductor and the storage device.

21. An apparatus for storing electrical energy discharged from a capacitive source, comprising:

a source connection configured to connect with a capacitive source, the capacitive source configured to produce an output voltage;

a switch connected to the source connection;

an inductor connected to the switch;

a storage device connected to the inductor; and a controller configured to close the switch after an output voltage of the source is detected to exceed a threshold value and as the output voltage of the source is detected to peak.

22. An apparatus for storing electrical energy discharged from a piezoelectric transducer, comprising:

the piezoelectric transducer;

a switch connected to the piezoelectric transducer;

an inductor connected to the switch;

a storage device connected to the inductor; and a controller configured to close the switch after an output voltage of the piezoelectric transducer is detected to exceed a threshold value and as the output voltage of the piezoelectric transducer is detected to peak.

* * * * *